United States Patent [19]

Sekine

[11] Patent Number: 5,298,893
[45] Date of Patent: Mar. 29, 1994

[54] GRADATION DISPLAY CONTROL APPARATUS FOR CONVERTING COLOR DATA DESIGNATED BY APPLICATION PROGRAM INTO GRADATION DATA

[75] Inventor: Norihisa Sekine, Oome, Japan

[73] Assignee: Kabushiki Kaisha Toshiba, Kawasaki, Japan

[21] Appl. No.: 918,145

[22] Filed: Jul. 24, 1992

Related U.S. Application Data

[63] Continuation of Ser. No. 559,345, Jul. 27, 1990, abandoned.

[30] Foreign Application Priority Data

Jul. 31, 1989 [JP] Japan .................................. 1-198357

[51] Int. Cl.$^5$ .............................................. G09G 3/00
[52] U.S. Cl. ...................................... 345/63; 345/147; 345/3
[58] Field of Search ............... 340/701, 703, 793, 784, 340/811, 717, 767; 358/80, 236

[56] References Cited

U.S. PATENT DOCUMENTS

4,737,772  4/1988  Nishi et al. ........................... 340/703
4,751,502  6/1988  Ishii et al. ............................ 340/706

*Primary Examiner*—Alvin E. Oberley
*Assistant Examiner*—Regina Liang
*Attorney, Agent, or Firm*—Cushman, Darby & Cushman

[57] ABSTRACT

Color data is converted into specific number of gradation data. A table is provided storing a correspondence between gradation data and color data. The gradation data is computed based on Gradation data=K SIN ($\alpha x + \beta$) $0 \leq x \leq n$ wherein K is a constant, x is a color data, $\beta$ defines phase and contributes to modify the gradation data for the color data, and $\alpha$ defines frequency and contributes to modify a degree of the modification. Two color data having large luminance levels are converted into gradation data having a large difference in gradation level. Control data for changing the values of $\alpha$ and $\beta$ in the above equation is input from a keyboard. A user can arbitrarily change the gradation data to be set in the conversion table from the keyboard.

5 Claims, 8 Drawing Sheets

F I G. 1 (PRIOR ART)

| ADDRESS | DATA | ADDRESS | DATA | ADDRESS | DATA | ADDRESS | DATA |
|---------|------|---------|------|---------|------|---------|------|
| 00 | 0 | 10 | 7 | 20 | D | 30 | (F) |
| 01 | 1 | 11 | 8 | 21 | D | 31 | (F) |
| 02 | 1 | 12 | 8 | 22 | E | 32 | (F) |
| 03 | 1 | 13 | 9 | 23 | E | 33 | (F) |
| 04 | 1 | 14 | 9 | 24 | E | 34 | (F) |
| 05 | 2 | 15 | A | 25 | F | 35 | (F) |
| 06 | 2 | 16 | A | 26 | F | 36 | (F) |
| 07 | 2 | 17 | B | 27 | F | 37 | (F) |
| 08 | 3 | 18 | B | 28 | (F) | 38 | (F) |
| 09 | 3 | 19 | B | 29 | (F) | 39 | (F) |
| 0A | 3 | 1A | C | 2A | (F) | 3A | (F) |
| 0B | 4 | 1B | C | 2B | (F) | 3B | (F) |
| 0C | 4 | 1C | C | 2C | (F) | 3C | (F) |
| 0D | 4 | 1D | D | 2D | (F) | 3D | (F) |
| 0E | 5 | 1E |  | 2E | (F) | 3E | (F) |
| 0F | 6 | 1F |  | 2F | (F) | 3F | (F) |

(F): UNUSED

GRADATION DISPLAY CONTROL APPARATUS FOR CONVERTING COLOR DATA DESIGNATED BY APPLICATION PROGRAM INTO GRADATION DATA

This is a continuation of Ser. No. 07/559,345, filed Jul. 27, 1990, abandoned.

BACKGROUND OF THE INVENTION

1. Field of the Invention

The present invention relates to a display control apparatus which includes a flat panel display unit such as a plasma display unit or a liquid crystal display unit as a standard I/O device and can be arbitrarily connected to a CRT display unit, and can be suitable for use in a computer system such as a personal computer and a personal workstation.

2. Description of the Related Art

Liquid crystal display and plasma displays have been used as display units for conventional lap-top type personal computers and personal workstations. However, strong demand has arisen for running an application program created for a CRT display unit in the above computer so as to utilize a wealth of all previous software. For this reason, the above computer equipped with a plasma display unit as a standard I/O device is arranged to be connectable to a CRT display unit as an optional I/O device.

A CRT display unit multigradation palette (CRT palette) is separated from a plasma display unit gradation designation (4 through 16 gradation levels) palette (PDP palette), and different palette values are set therein.

For this reason, when a CRT application program runs to dynamically update the CRT palette, the palette value of the PDP palette is not changed even if the CRT palette value is changed.

Similarly, in a system to which a CRT color display unit can be arbitrarily connected, different palette values are set in a color palette for designating display colors of the CRT color display unit and the PDP palette. Even if the palette value of the CRT palette is arbitrarily changed in accordance with a display color designated by CRT application software, the palette value of the PDP palette is not changed. For this reason, although a change in gradation or hue can be identified on the CRT display screen, the change cannot be reflected on the PDP, resulting in inconvenience.

In order to solve the above problem, Hiroki ZENDA (U.S. Ser. No. 406,066 titled "DISPLAY CONTROL APPARATUS FOR CONVERTING COLOR/MONOCHROMATIC CRT GRADATION INTO PDP GRADATION", filed on Sep. 12, 1989, and assigned by the same assignee of this application) discloses a technology where plasma display unit gradation data is generated from CRT display unit gradation data set in a CRT palette and the plasma display unit gradation data is output to the PDP palette.

Figure 1:
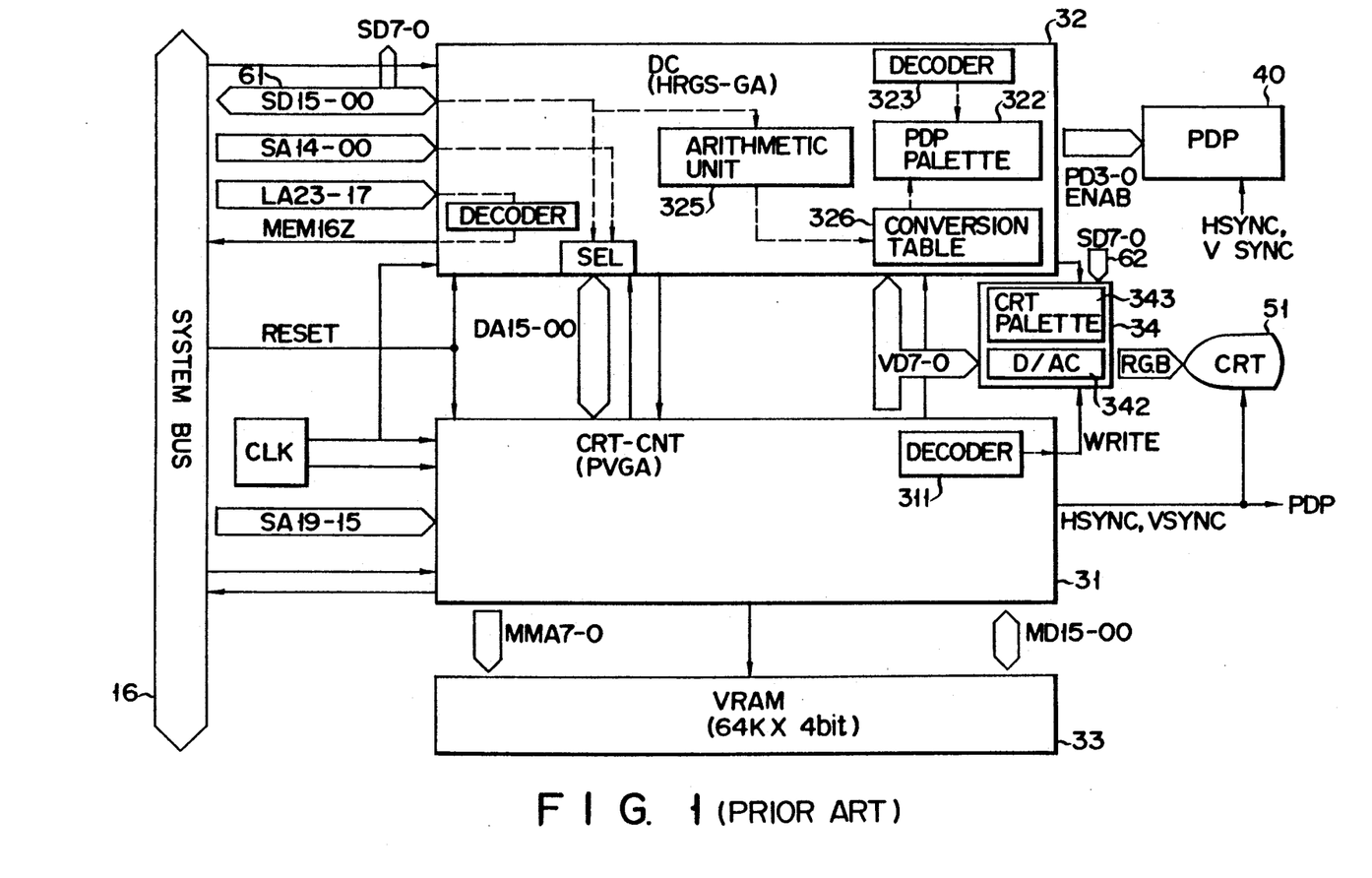
FIG. 1 illustrates a high-resolution display system having a display control function for driving a CRT display at high resolution with multilevel gradation and a display control function for simultaneously driving CRT and plasma display units.

FIG. 1 is a block diagram showing a detailed arrangement of a high-resolution display system (HRGS: High Resolution Graphic Subsystem) having a display control function for driving the CRT display at a high resolution (720 dots in the horizontal direction) with multilevel gradation (64 gradation levels) and a display control function for simultaneously driving CRT and plasma display units (in this case, each display unit has a horizontal display resolution of 640 dots). A CRT display unit can be arbitrarily connected to the HRGS 30 through a connector not shown.

An element 31 is a CRT display controller (CRT-CNT) for driving a CRT display unit 51 at the high resolution (720 dots) with multilevel gradation (64 gradation levels). The CRT-CNT 31 includes a decoder 311. The decoder 311 decodes a port address of a CRT palette 343 and outputs a write signal to the CRT palette 343.

A display controller 32 has a bus interface function for exchanging various display control data with a CPU through a system bus 16 and a function for controlling the display operation of a plasma display unit (PDP) 40 and is constituted by one chip of, e.g., a programmable logic array (PLA). The display controller 32 includes an arithmetic unit 325. The arithmetic unit 325 comprises, e.g., a programmable logic array and performs a predetermined arithmetic operation of palette data supplied from a CRT palette 343 through a data bus (SD7–SD0) 62 to output 39 gradation parameters. A conversion table 326 is arranged to output 16 gradation data corresponding to 39 gradation parameters.

A CRT-CNT reads out display data (since a color CRT is used in this embodiment, 16 color data are read out) from a VRAM 33, and the readout data are written in the CRT palette 343 in a CRT display data generator 34 through an internal bus (VD7–VD0). The color CRT palette 343 converts 16 color data into 262,141 color tone data (=64 colors×(R, G, and B components)). The 262,144 color tone data are converted into analog display data by a D/A converter 342, and analog display data are output to a color CRT display unit 51. As a result, image data represented by color information designated by the CRT palette 343 is displayed on the color CRT display unit 51.

The 64 data of each of the R, G, and B components are supplied to the arithmetic unit 325 in the display controller 32 through the data bus (SD7–SD0). The arithmetic unit 325 calculates gradation parameters on the basis of equations (1) and (2).

A gradation intensity is calculated by equation (1):

$$\text{Gradation Intensity} = (3 \times \text{red data}) + (6 \times \text{green data}) + (1 \times \text{blue data}) \quad (1)$$

The gradation parameter is calculated by equation (2) using the above gradation intensity:

Gradation Parameter = (gradation intensity)/16 (the decimal part is rounded off)

The 262,144 color tone data supplied from the color CRT palette 343 are converted into 39 gradation parameters by the arithmetic unit 325. These 39 gradation parameters are input to the color conversion table 326.

Figure 2:
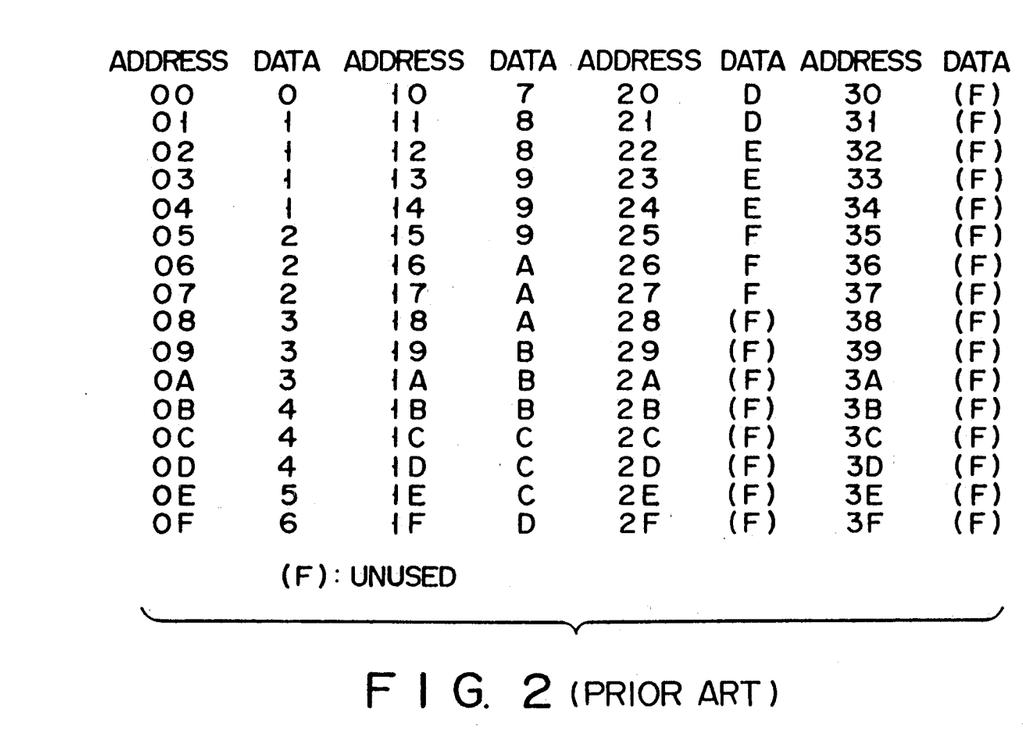
FIG. 2 is a table showing the contents (i.e., correspondence between the CRT and PDP gradation data) of a conversion table shown in FIG. 1.

The conversion table 326 is arranged, as shown in FIG. 2. Addresses "00" (hexadecimal notation) through "27" correspond to gradation parameters 0 through 39, respectively.

The color conversion table 326 outputs gradation data (gradation level 0 through gradation level 15) corresponding to the input gradation parameters to the PDP palette 322. As a result, a PDP 40 performs a display in accordance with gradation data (one of gradation level 0 to gradation level 15) set in the PDP palette 322.

Figure 3:
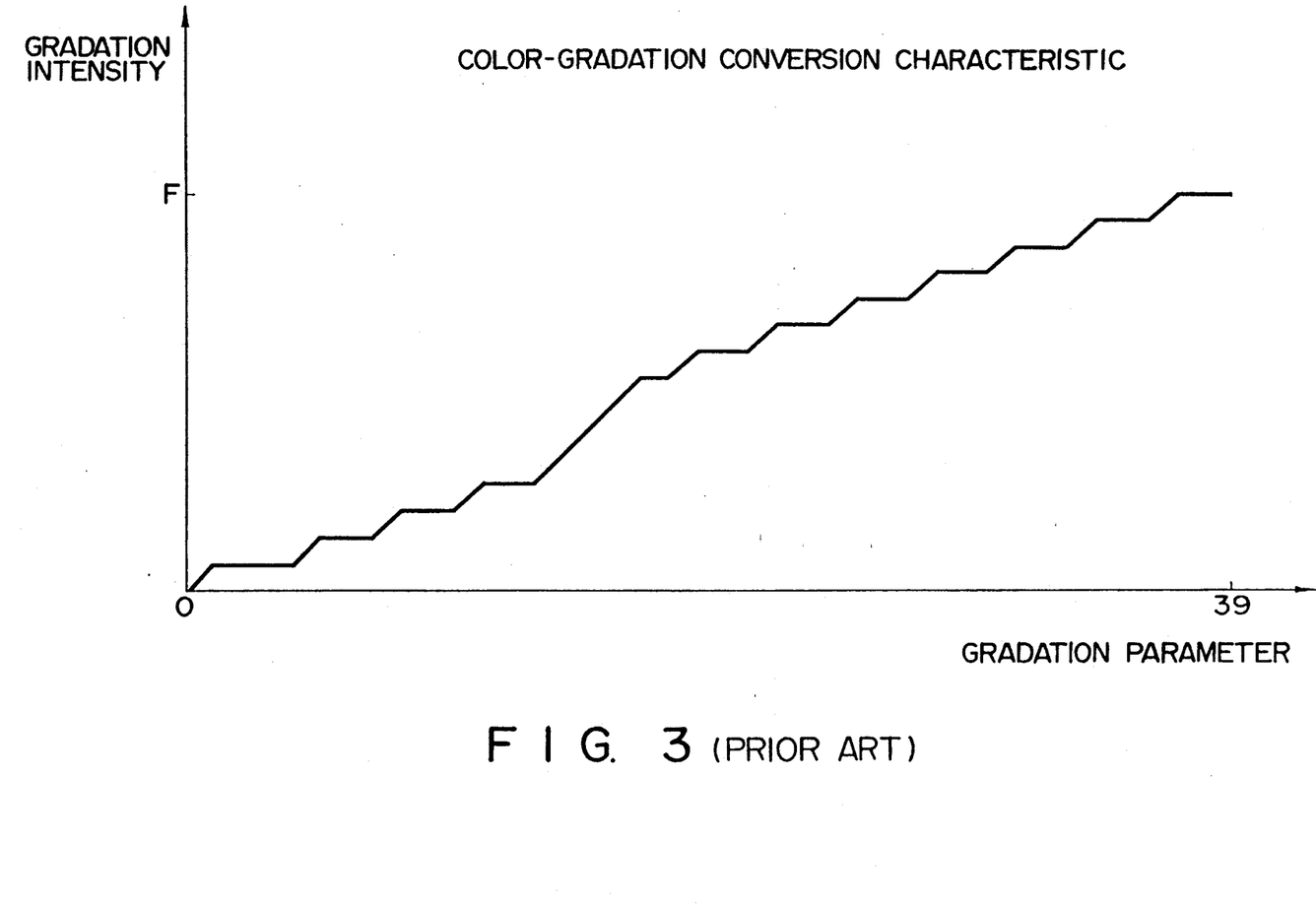
FIG. 3 is a color-gradation conversion characteristic based on the contents of the table shown in FIG. 2.

FIG. 3 shows a color-gradation conversion characteristic where the gradation parameter and the gradation intensity are given in abscissa and in ordinate, respectively. As shown in FIG. 3, the conversion characteristic is roughly linear. Therefore, luminance level of color data and gradation level are approximately proportional to each other. In other words, a bright color is converted into a bright gradation, and a dark color is converted into a dark gradation. For this reason, if the bright colors are superimposed on each other, e.g., a bright white is superimposed on a bright yellow background, there is little difference in the gradation level, and this makes it difficult to differentiate between these colors visually.

SUMMARY OF THE INVENTION

An object of the present invention is to provide a display control apparatus which converts color data into a desirable gradation from a view point of visibility when an application program for a color display device is executed by a personal computer having a monochrome flat panel display.

Another object of the present invention is to provide a gradation display controller in which a user can convert color data into an arbitrary gradation level when an application program for a color display unit is executed by a personal computer having a monochrome flat panel display unit.

According to a first aspect of the present invention, there is provided a gradation display control apparatus for a personal computer having a flat panel display unit for performing a gradation display, which comprises: non-linear type converting means for non-linearly converting color data designated by an application program prepared for a color display unit into gradation data; and means for displaying the non-linearly converted gradation data on the flat panel display unit.

According to a second aspect of the present invention, there is provided a method for controlling a gradation display of a personal computer having a flat panel display unit for performing a gradation display, which comprises the steps of: a) non-linearly converting color data designated by an application program prepared for a color display unit into gradation data; and b) displaying the non-linearly converted gradation data on the flat panel display unit.

According to the present invention, in a case where two different color data having large luminance levels are superimposed on each other or displayed to be adjacent to each other, color data are non-linearly converted and a large difference is made in the converted gradation data, thereby making it possible to clearly display data on the flat panel display unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 4A:
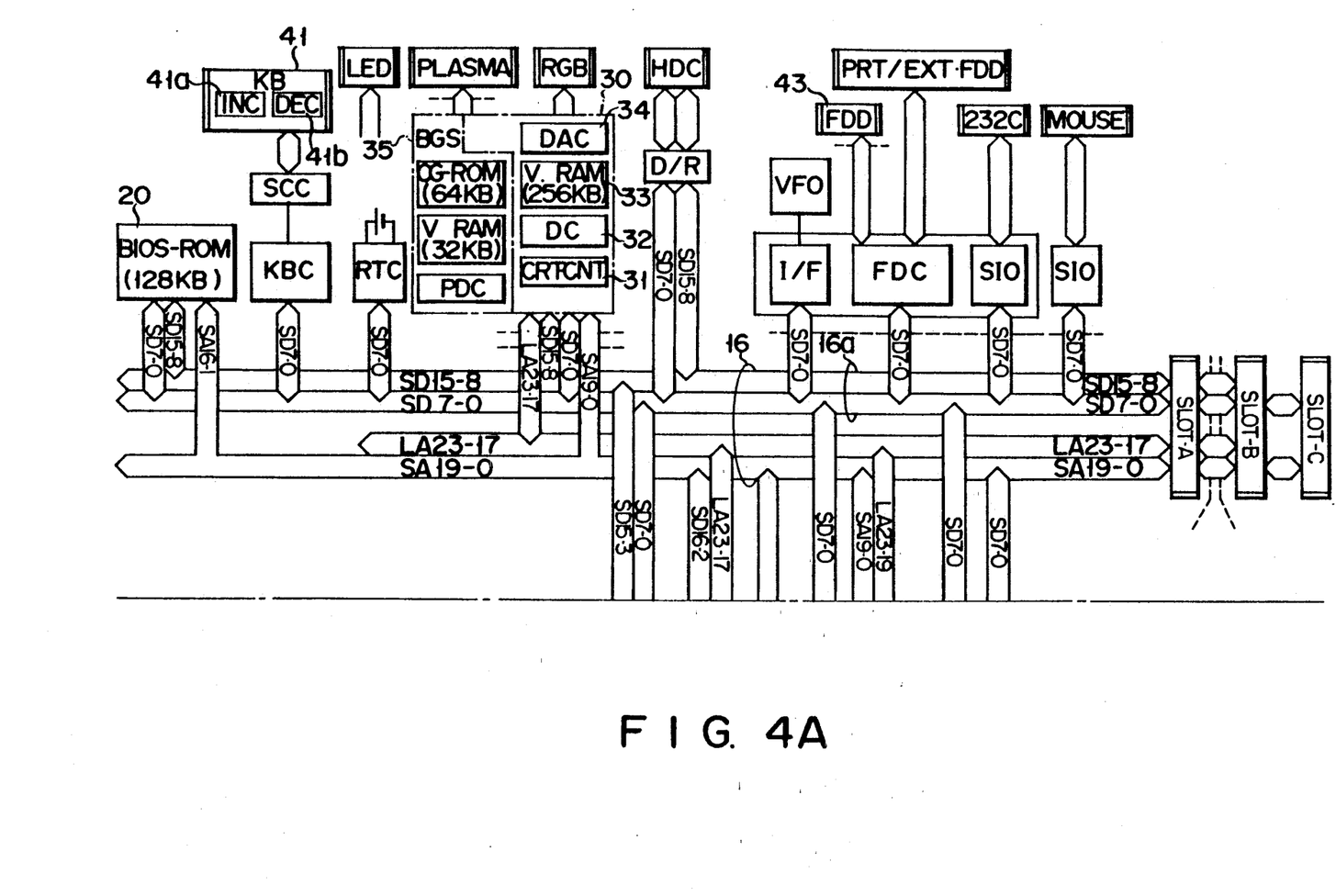
FIGS. 4A and 4B form a block diagram showing an overall arrangement of, e.g., a lap-top type personal computer incorporating a gradation display control apparatus of the present invention.
Figure 4B:
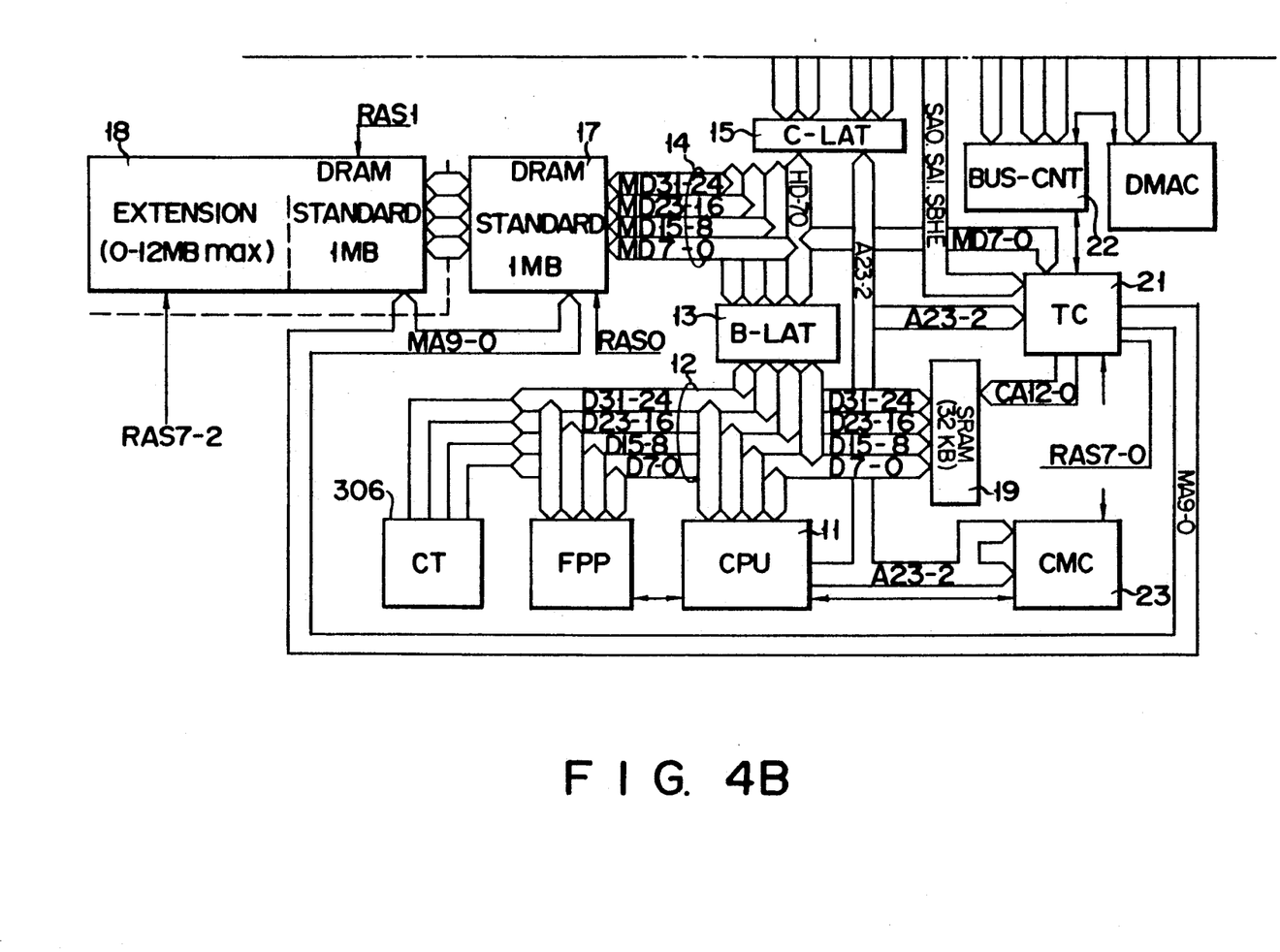
Figure 5:
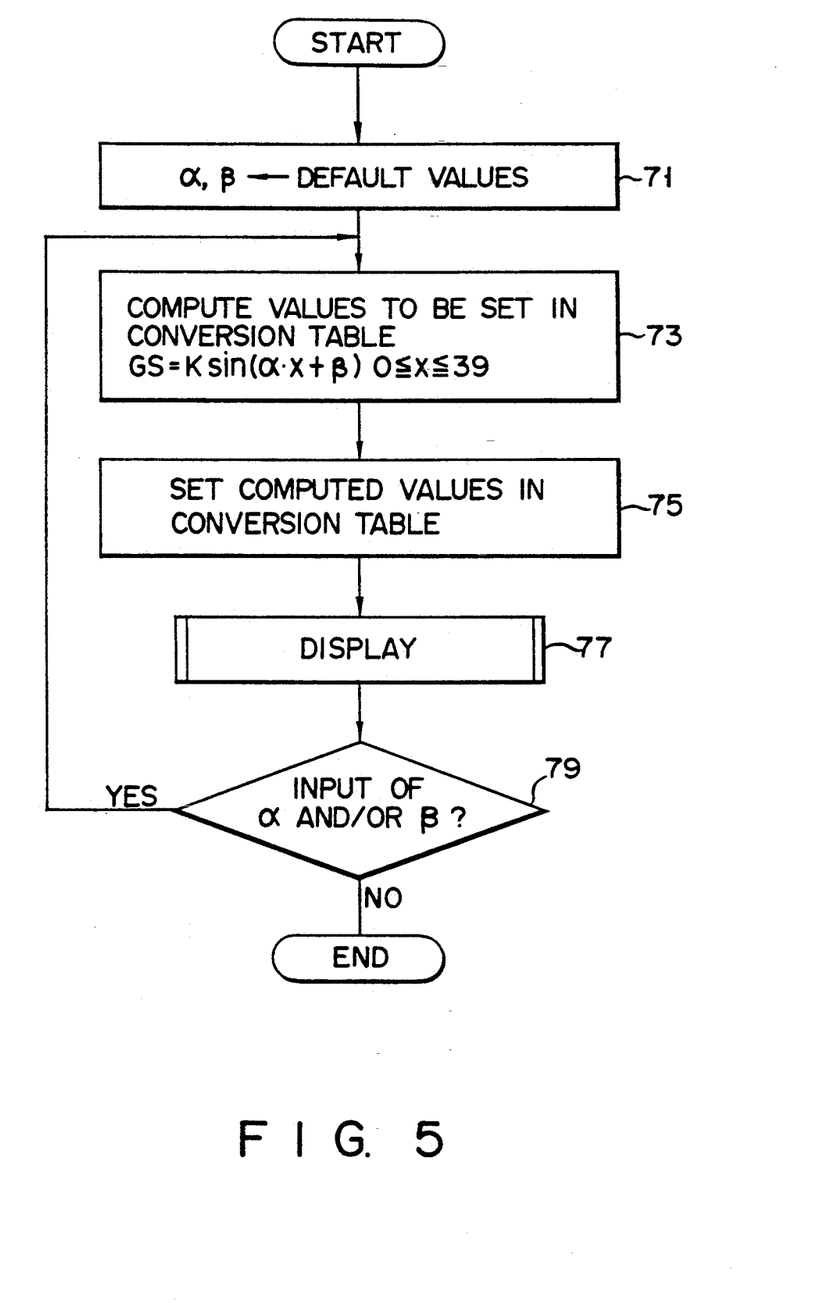
FIG. 5 is a flowchart showing procedure of computing values to be set in the conversion table.
Figure 6:
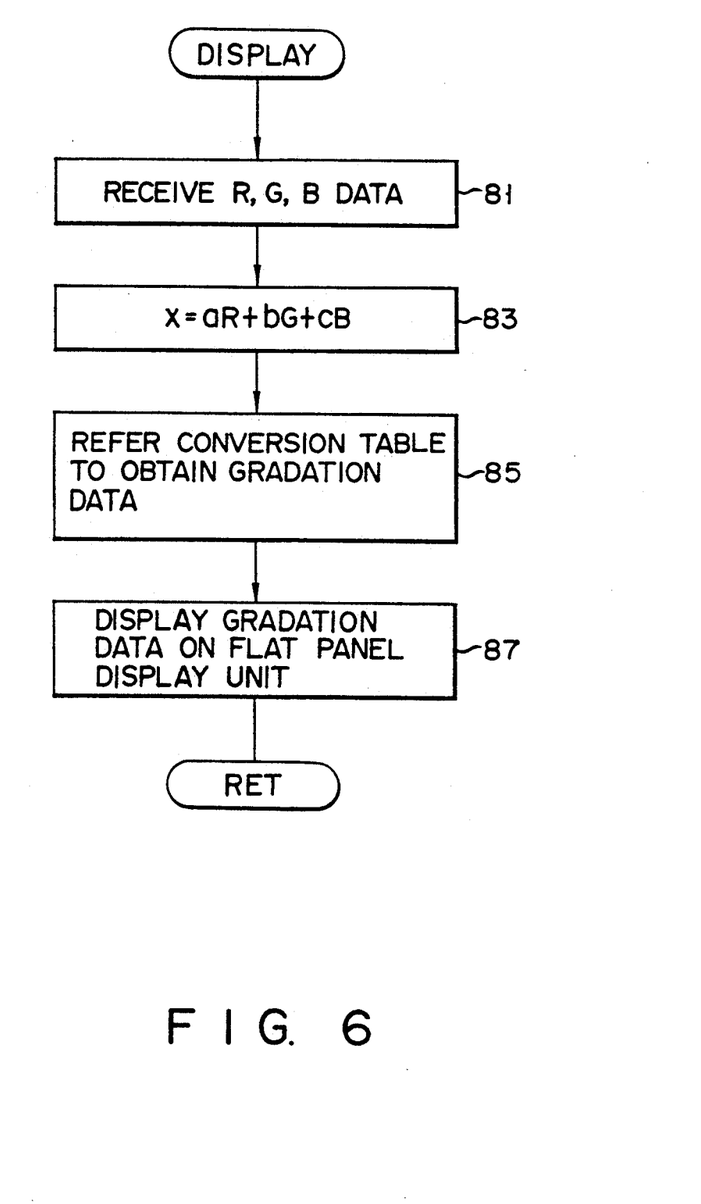
FIG. 6 is a flowchart showing procedure of converting color data into gradation data by referring the conversion table, and displaying the gradation data on the flat panel display unit.

FIGS. 4A and 4B form a block diagram showing an overall arrangement of. e.g., a lap-top type personal computer incorporating a gradation display control apparatus of the present invention. Referring to FIG. 4B, a element 11 is a central processing unit (CPU) for controlling the overall system. An element 12 is a 32-bit data bus (D31-D24, D23-D16, D15-D8, D7-D0). An element 13 is a latch circuit (B-LAT) for latching data on the data bus 12. An element 14 is a 32-bit memory bus (MD31-MD24, MD23-MD16, MD15-MD8, MD7-MD0). An element 16 is a system bus consisting of 20-bit and 7-bit address buses (SA19-SA0, LA2-3-LA17) and a 16-bit data bus (SD15-SD8, SD7-SD0) 16a. An element 15 is a latch circuit (C-LAT) for latching address data on the address bus (SA19-SA0, LA2-3-LA17) and data on the data bus (SD15-SD8, SD7-SD0) 16a. Elements 17 and 18 comprise internal dynamic random access memories (DRAMs), respectively, backed-up with batteries. An element 19 is a cache memory, and an element 20 is an internal ROM (BIOS-ROM) for storing a basic input and output system program. The BIOS-ROM 20 stores and designates CRT display timing data set by a CRT controller 31 (to be described later), and default values of $\alpha$ and $\beta$ to be described later. A floppy disk drive 43 stores a disk operating system. Programs represented by the flowcharts of FIGS. 5 and 6 are included in the disk operating system. The operating system from the floppy disk drive 43 is loaded in the DRAM 17. A keyboard 41 has an increment key 41a and a decrement key 41b. An operator depresses the increment keys 41a and 41b when he wants to increase and decrease degree of gradation, respectively. Furthermore, parameters $\alpha$ and $\beta$ in the computation explained below are input by keys of English character "a" and "b".

An element 21 is a timing controller (TC) for performing timing control of the overall system including memory control timings. An element 22 is a bus controller (BUS-CNT) for controlling the system bus 16. An element 23 is a cache memory controller (CMC) for controlling the cache memory 19.

An element 30 is a high-resolution display system (HRGS: High Resolution Graphic Subsystem) having a display control function for driving the CRT display at a high resolution (720 dots in the horizontal direction) with multilevel gradation (64 gradation levels) and a display control function for simultaneously driving CRT and plasma display units (in this case, each display unit has a horizontal display resolution of 640 dots). The HRGS 30 can be arbitrarily connected to the display control apparatus. A CRT display unit can be arbitrarily connected to the HRGS 30 through a connector C1 (not shown in FIGS. 4A and 4B). An element 35 is a display system (BGS) for driving a plasma display unit (PDP). The plasma display unit PDP is connected to the BGS 35 through a connector C2 (not shown in FIGS. 4A and 4B). Note that the plasma display unit is a standard I/O device and is kept connected to the connector C2.

Elements SL1 and SL2 are extended slots (SLOT-B and SLOT-C) capable of connecting various types of extended boards including a display adapter board.

An operation of one embodiment of the present invention will be explained with reference to the flowcharts of FIGS. 5 and 6.

FIG. 5 is a flowchart showing an operation of modifying the conversion table. The program represented by the flowchart of FIG. 5 is stored in DRAM 17, and is started in response to a command of a disk operating system (DOS).

Figure 7A:
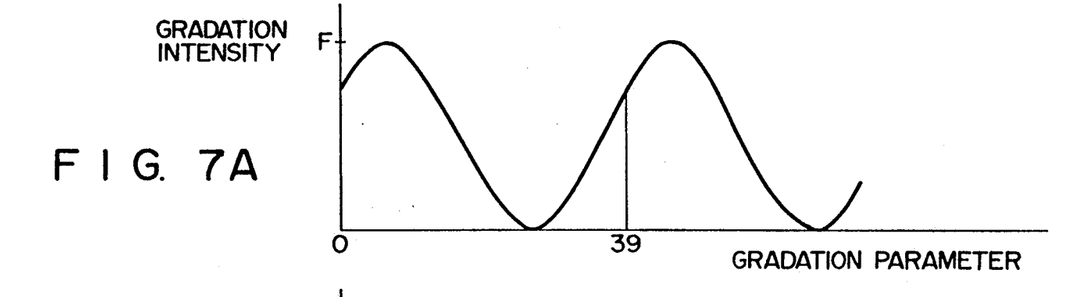
FIGS. 7A through 7C show characteristics of gradation intensity and gradation parameter when $\alpha$ and $\beta$ are changed in accordance with the process shown in the flowchart of FIG. 5.
Figure 7B:
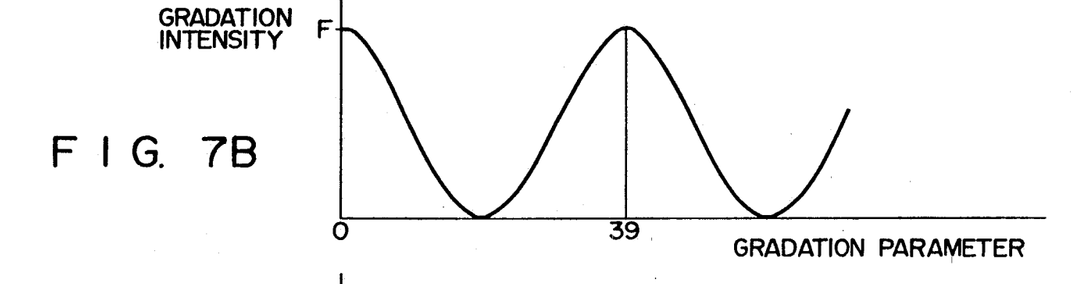
Figure 7C:
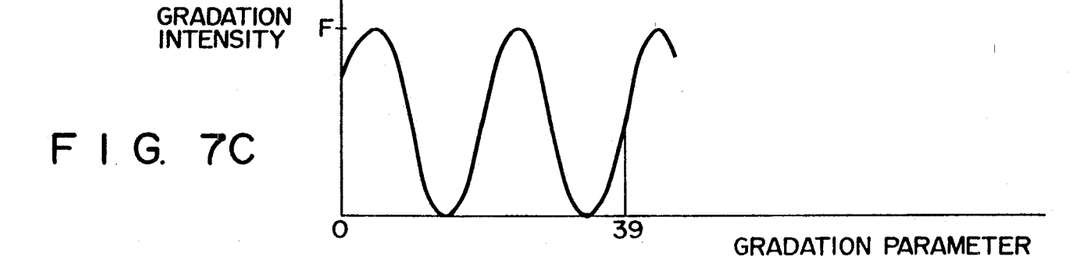

In step 71, the CPU 11 reads the default values for $\alpha$ and $\beta$ from the BIOS-ROM 20 and sets the values to parameter $\alpha$ and $\beta$, when the program stored in DRAM 17 is started in response to the entry of the DOS command. In step 73, the CPU 11 computes values to be set in the conversion table 326. More specifically, the CPU 11 computes gradation intensity corresponding to gradation parameters based on the following equation:

$$GS = K \operatorname{SIN} (\alpha \cdot x + \beta) \quad 0 \leq x \leq 39$$

wherein GS is a gray scale; K is a constant; x is a gradation parameter ranging from 0 through 39; and $\alpha$ and $\beta$ are parameters which can be arbitrarily set by a user. $\alpha$ contributes to modify the correspondence between gradation parameter and the gradation intensity, and $\beta$ contributes to change the degree of the modification. In other words, the parameter "$\beta$" can change the phase of the characteristic curve as shown in FIGS. 7A and 7B to thereby nonlinearly convert the color data into gradation data. The parameter "$\alpha$" changes the frequency of the characteristic curve to thereby change the degree of the nonlinear conversion, as shown in FIG. 7C.

In step 75, the CPU 11 sets the computed gradation intensity corresponding to 39 gradation parameters in the conversion table 326. Then, in step 77, the CPU 11 calls a display routine to display on PDP 40 the gradation data.

In the display routine shown in FIG. 6, the CPU 11 in step 81 receives R, G, and B data from CRT palette 343 in FIG. 1. Then, in step 83, the CPU 11 computes the gradation parameter based on the following equation (2):

$$x = aR + bG + cB \quad (2)$$

wherein x is a gradation parameter, and a, b, and c are constants, e.g., "3", "6", and "1", respectively.

The CPU 11 then refers the conversion table 362 to obtain the gradation data (gradation intensity) corresponding to the computed gradation parameter. Then, in step 87, the CPU 11 displays the gradation data on the PDP 40.

In a case where a user views the displayed image on the PDP 40 in the step 77 and cannot clearly recognize the color difference as a difference in degree of gradation, the user changes the gradation level. First, to designate the parameter $\alpha$ is changed, the English character key "a" is input from the keyboard 41. Then, the parameter $\alpha$ is changed while depressing the increment key 41a and decrement key 41b. In this case, while the increment key 41a is being depressed, the value of $\alpha$ increases and the degree of nonlinear conversion becomes higher. Similarly, while the decrement key 41b is being depressed, the value of $\alpha$ continuously decreases and the degree of gradation becomes lower. Moreover, the user depressed the character key "b" to designate parameter $\beta$. Then, the user operates the increment key 41a and the decrement key 41b in the same manner as the above in order to change the value of $\beta$, to thereby nonlinearly convert the color data into gradation data. Thereafter, the control is returned to step 73 and the gradation intensity is calculated again based on the above mentioned equation (1). The operations of steps 73 to 79 are repeated until the user obtains a desirable degree of gradation. As a result, as shown in FIGS. 7A to 7C, even if the luminance of color data are high, it is possible to have a difference in the degree of gradation. Also, even if the luminance of color data are low, the Sine curve can be set to increase the degree of nonlinear conversion.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A gradation display control apparatus for a personal computer having a flat panel display unit performing a gradation display, comprising:
   a parameter storage device for storing and initially setting at least one default parameter to be used in display conversion;
   non-linear type converting means for receiving said default parameters and color data and non-linearly converting said color data into gradation data based on a non-linear equation that does not have a linear relationship between its input and its output;
   a display driver for driving the display unit to display the non-linearly converted gradation data on the flat panel display unit as part of an overall display;
   an input means including a keyboard; and
   controlling means for accepting, subsequent to said display driving by said display driver, a change command from said keyboard to change said at least one default parameter to a different parameter, and coupling said different parameter to said converting means and said display driver and new color data to form a new display based thereon, and for continuing to accept change commands subsequently.

2. The apparatus according to claim 1, wherein said nonlinear type converting means includes a conversion table storing a correspondence between said color data and said gradation data, and means for computing said gradation data to be set in said conversion table based on the following equation:

$$\text{Gradation data} = K \text{ SIN } (\alpha x + \beta) \quad 0 \leq x \leq n$$

wherein K is a constant, x is color data, $\beta$ is said at least one default parameter which defines nonlinear conversion of said color data into said gradation data and $\alpha$ is said at least one default parameter which defines a degree of the nonlinear conversion, and n is a number of said color data.

3. The apparatus according to claim 2, wherein said input means includes means for inputting values of $\alpha$ and $\beta$ as said at least one default parameter.

4. Apparatus according to claim 3 further comprising means for modifying a correspondence between a gradation parameter and a gradation intensity based on a value of said at least one default parameter $\alpha$, and means for changing a degree of modification based on said at least one default parameter $\beta$.

5. Apparatus according to claim 3 wherein said gradation data is done according to a characteristic curve, said at least one default parameter $\alpha$ changes a frequency of said characteristic curve and said at least one default parameter $\beta$ changes a phase of said characteristic curve.

* * * * *